United States Patent
Brahler, II et al.

(10) Patent No.: US 6,564,848 B1
(45) Date of Patent: May 20, 2003

(54) BEAD VICE TIRE TOOL

(75) Inventors: Richard W. Brahler, II, Jacksonville, FL (US); Larry D. Renaker, Granite City, IL (US)

(73) Assignee: Gaither Tool Company, Inc., Jacksonville, IL (US)

( * ) Notice: Subject to any disclaimer, the term of this patent is extended or adjusted under 35 U.S.C. 154(b) by 0 days.

(21) Appl. No.: 09/298,564

(22) Filed: Apr. 22, 1999

(51) Int. Cl.[7] ............................................. B60C 25/132
(52) U.S. Cl. .................... 157/1.17; 157/1.2; 157/1.1
(58) Field of Search ............................. 157/1.1, 1.17, 157/1.2, 1.26, 1.21, 11

(56) References Cited

U.S. PATENT DOCUMENTS

| | | | |
|---|---|---|---|
| 2,898,977 A | * 8/1959 | Denn | 157/1.17 |
| 3,181,587 A | 5/1965 | Morrison et al. | 157/1.17 |
| 3,191,656 A | 6/1965 | Edwards | 157/1.17 |
| 3,221,795 A | 12/1965 | Whited | 157/1.2 |
| 3,747,661 A | 7/1973 | Freyling | 157/1.17 |
| 4,524,813 A | * 6/1985 | Gering | 157/1.17 |
| 4,580,612 A | * 4/1986 | Smithkey | 157/1.2 |
| 4,850,413 A | 7/1989 | Blank | 157/1.17 |
| 5,191,934 A | 3/1993 | Wicklund | 157/1.17 |
| 5,421,392 A | * 6/1995 | Unrau | 157/1.17 |

* cited by examiner

Primary Examiner—David A. Scherbel
Assistant Examiner—David B. Thomas
(74) Attorney, Agent, or Firm—Mark E. Wiemelt

(57) ABSTRACT

A tire tool for facilitating the removal of a tire from a wheel rim having multiple radially spaced stud holes. The tire tool comprises a main body portion with two threaded bores at opposite ends of the main body portion. Secured to a first threaded bore of the main body portion is a means for driving the first end of the main body portion in a downward direction. The driving means is adapted to rest on the inner edge of a tire. Secured to the second threaded bore of the main body portion is a means for releasably securing the main body portion to the plurality of stud holes of the rim. The tire removal is accomplished by the downward driving force which causes the bead of the tire to break from the rim of the wheel.

24 Claims, 8 Drawing Sheets

BEAD VICE TIRE TOOL

FIELD OF THE INVENTION

This invention relates to improvements in tire tools and, more particularly, to a tire tool for facilitating the removal of a tire from a wheel rim.

BACKGROUND OF THE INVENTION

The removal of tires on wheel rims is a difficult and time consuming operation, particularly the removal of large diameter tires, such as found on large highway and off-highway vehicles. The usual passenger automobile tire is sufficiently small and light weight as to permit manually positioning thereof at an elevation above the normal floor or ground level and on a substantially horizontally disposed machine having a tool mounted thereon which may be utilized for breaking the seal between the tire and wheel rim. Once the seal has been broken between the bead of the tire and the wheel rim, the tool may be manually moved around the outer periphery of the tire bead for separating the tire from the wheel rim, and the application of a suitable manual pressure against the loosened tire permits the removal of the tire from the wheel rim. Large truck tires, and the like, however, are heavy and unwieldy and, as a rule, cannot be manipulated in this manner. The disadvantages will be readily apparent.

Many tools have been developed for facilitating the removal of tires from the associated wheel rims, such as the Threlfall Pat. No. 786,611; the Hussey Pat. No. 834,908; the Dickey et al. Pat. No. 1,587,634; the Wendelken Pat. No. 2,615,507; the Schulta et al. Pat. No. 3,029,860; and the McKinney Pat. No. 3,104,695. These tire tools, however, ride around the periphery of the tire and wheel rim and have not been found to be efficient or effective for the removal of the large tires in widespread use today.

In order to overcome these disadvantages, the tire tool shown in this application was developed whereby tires may be readily removed from the associated wheel rim with ease and in a matter of minutes. The small size of the present tire tool is advantageous over the heavy and cumbersome tire tools on the market. Another advantage is that the new tire tool is portable and can be adapted for use in any situation. As is readily apparent, the present tire tool has these and other advantages which will be described in the following sections.

SUMMARY OF THE INVENTION

The tire tool of the present invention is used to facilitate the removal of a tire from the wheel rim. The tire tool is adapted for use with rims that have a plurality of stud holes spaced outwardly from the center of the rim. The tire tool comprises a main body portion which has two bores at opposite ends of the main body portion. Secured to the first bore of the main body portion is a means for driving the first end of the main body portion in a downward direction. The driving means rests on the tire. Secured to the second bore of the main body portion is a means for releasably engaging the main body portion to one of the plurality of stud holes of the rim. After the tire tool is positioned on the tire and secured to the wheel rim, the driving means of the tire tool on the first end of the main body portion causes the tire bead to break from the rim of the wheel in a safe and efficient manner.

It is desired that the two bores of the main body portion be threaded bores. It is further desired that the main body portion be substantially planar, that the driving means be the combination of a first threaded bolt secured to a wheel socket, and that the engaging means be a second threaded bolt secured to a wing nut. The main body portion should be sized so that when the engaging means engages one of the stud holes of the rim, the driving means rests on the tire bead proximate the outer periphery of the wheel rim. The first threaded bolt may preferably have a horizontal extending threaded aperture near the bottom end thereof for removably securing a screw. This screw will prevent the first threaded bolt from moving downward so as to pierce the wheel socket and/or the tire. Thus, it is required that the screw, when removably secured to the horizontally extending threaded aperture of the first threaded bolt, be of a length greater than the length of the horizontally extending aperture. It is also desired that the first threaded bolt have a horizontal groove located below the horizontally extending threaded aperture.

The wheel socket is preferably adapted to rest on the inner periphery of the tire proximate the outer periphery of the wheel rim. As such, the first threaded bolt is removably secured to the wheel socket by way of being inserted into a vertically protruding hole in the wheel socket. The wheel socket should also have two opposing horizontally extending holes proximate the vertically protruding hole. A thrust ball bearing is first inserted into the vertically protruding hole of the wheel socket. Then, a pair of steel balls are inserted into the horizontally extending holes of the wheel socket, so as to contact the horizontal groove of the inserted first threaded bolt. Thereafter, a pair of screws is inserted into the horizontally extending holes of the wheel socket adjacent to the pair of steel balls.

A second threaded bolt is preferably first inserted vertically upward through a radially spaced stud hole of the rim before being inserted into the second threaded bore of the main body portion. To better secure the second threaded bolt to the main body portion, a wing nut can be removably secured to the second threaded bolt from above the main body portion at the location where the second threaded bolt extends upward from the second threaded bore of the main body portion. It is most preferred that, to prevent the loss or separation of the second threaded bolt from the main body portion when the second threaded bolt is not removably secured to the second threaded bore of the main body portion, a wire cable be adapted to permanently fasten the second threaded bolt to the main body portion.

The tire tool greatly facilitates the removal of the tire from the rim because it is small in size, is not cumbersome to use and is highly portable for use at any location. Thus, the tire tool of the present invention has numerous advantages over prior tire tools used for similar purposes.

DETAILED DESCRIPTION OF THE INVENTION

The present invention is directed to a tire tool used to facilitate the removal of the wheel rim from a tire. The drawings accompanying this description depict various preferred embodiments of the invention which can be formed in a variety of ways. While the description will proceed with respect to the drawings, it will be readily understood by those skilled in the art that such descriptions and drawings are used to explain the novel features of the invention, rather than in any limiting sense.

Figure 1:
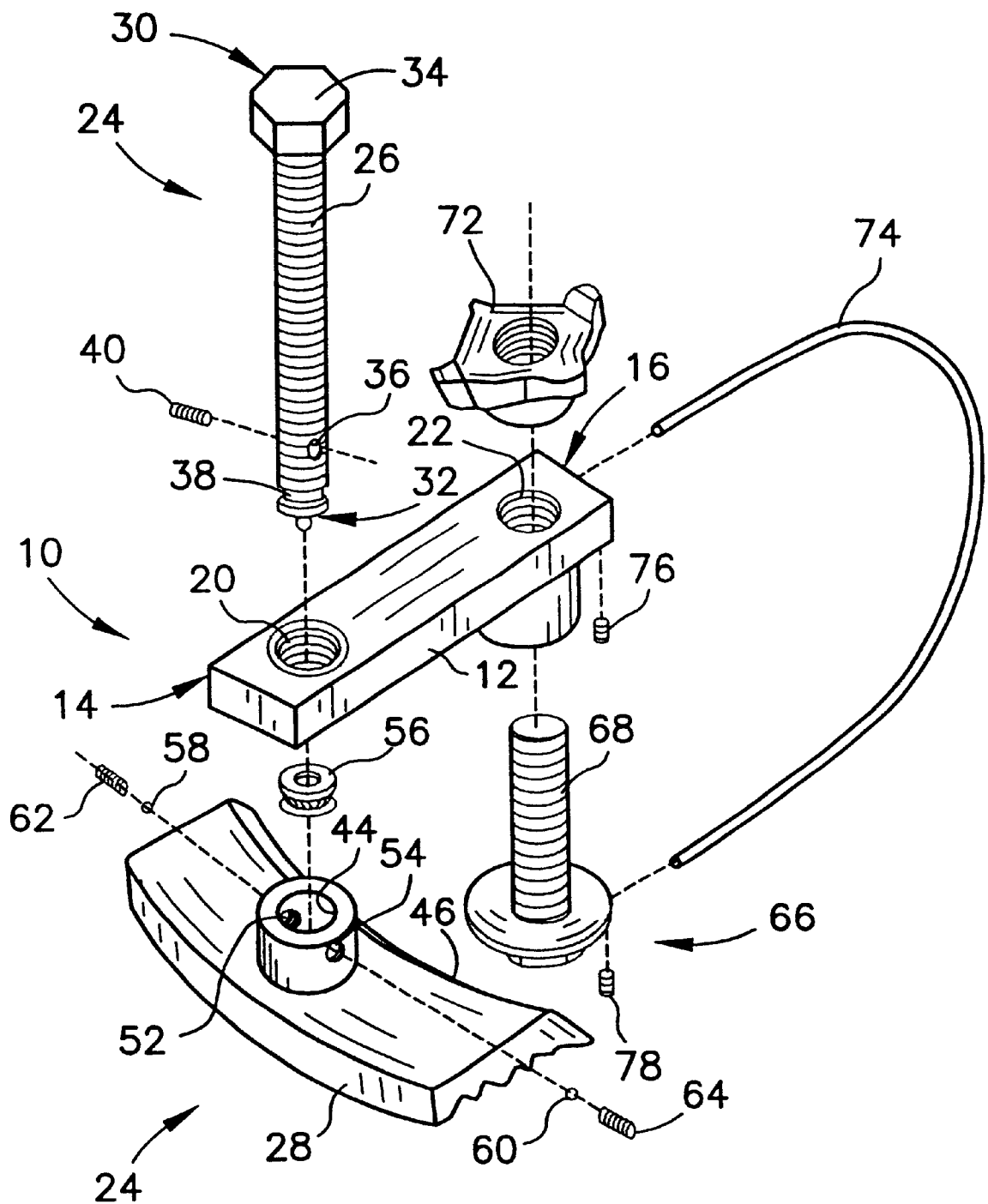
FIG. 1 shows a front elevational view of the tire tool when its components are not fully attached.

Referring to the drawings in detail, and particularly FIGS. 1 through 8, reference character 10 generally indicates a tire tool. FIG. 1 shows a first preferred embodiment of the detached tire tool 10 invention which comprises a main body portion 12 having a first end 14 and a second end 16. The main body portion 12 is most preferably a bracket plate 18. The main body portion 12 has a first vertically extending bore 20 proximate the first end 14 of the main body portion 12 and a second vertically extending bore 22 proximate the second end 16 of the main body portion 12. It is most preferred that the first vertically extending bore 20 and the second vertically extending 22 bore be threaded. Secured to the first bore 20 of the main body portion 12 is a means for driving 24 the first end 14 of the main body portion 12 in a downward direction. The preferred driving means 24 is a first threaded bolt 26 used in conjunction with a wheel socket 28.

The first threaded bolt 26 has a top end 30 and a bottom end 32. Located at the top end 30 of the first threaded bolt 26 is a head 34. In facilitating the driving means 24, it is also most preferred that the first threaded bolt 26 be defined with a horizontally extending threaded aperture 36 near its bottom end 32 and a horizontal groove 38 located below the horizontally extending threaded aperture 36. In this way, once the first threaded bolt 26 is removably secured to the first threaded bore 20 of the main body portion 12, a third screw 40 may be inserted through the horizontally extending threaded aperture 36 of the first threaded bolt 26, so that the first threaded bolt 26 will not pierce through the wheel socket 28 and/or the tire 42 (shown in later figures) when force is exerted on the driving means 24. As such, it is understood by one of ordinary skill in that art that the third screw 40 must be of a length greater than the length of the horizontally extending threaded aperture 36 of the first threaded bolt 26. The most preferred third screw 40 is a third hexagon socket set screw 40. The most preferred first threaded bolt is a first hexagon head bolt 26.

In securing the driving means 24, the first threaded bolt 26 is inserted from above the main body portion 12 down through the first threaded bore 20 thereof to meet the wheel socket 28 located below the main body portion 12. It is readily understood by one of skill in that art that the wheel socket 28 typically has a vertically protruding hole 44 where the first threaded bolt 26 removably contacts the wheel socket 28. It is further preferred that the wheel socket 28 have an arcuate edge portion 46 to substantially mirror the outer periphery 48 of the wheel rim 50 (shown in later figures).

It is most preferred that the wheel socket 28 have a horizontally extending first threaded hole 52 and a horizontally extending second threaded hole 54 proximate the vertically protruding hole 44 thereof. The first threaded hole 52 and second threaded hole 54 are most preferably in opposing positions on the wheel socket 28. In this preferred embodiment, a thrust ball bearing 56 is first placed in the vertically protruding hole 44 of the wheel socket 28 before the first threaded bolt 26 contacts the wheel socket 28. Thereafter, a first steel ball 58 and second steel ball 60 are inserted into the opposing horizontally extending first threaded hole 52 and second threaded hole 54 of the wheel socket 28 to contact the horizontal groove 38 of the removably inserted first threaded bolt 26. Then, a pair of first screw 62 and second screw 64 are inserted into the opposing horizontally extending first threaded hole 52 and second threaded hole 54 of the wheel socket 28 adjacent to the first steel ball 58 and second steel ball 60. In this way, the first threaded bolt 26 may freely rotate without moving in a downward motion. The most preferred first screw 62 and second screw 64 are a first hexagon socket set screw 62 and a second hexagon socket set screw 64.

As for the second end 16 of the main body portion 12, this second end 16 is removably secured to the wheel rim 50 (shown in later figures) by way of a releasably engaging means 66. The engaging means 66 most preferably is a second threaded bolt 68 that is inserted upward from underneath one of a plurality of stud holes 70 of the rim 50 (shown in later figures) to engage the second threaded bore 22 of the main body portion 12. It is even more preferred that the second threaded bolt 68 be a hexagon head bolt 68. Once the second threaded bolt 68 is inserted upward through the second threaded bore 22 of the main body portion 12, a wing nut 72 is removably secured to the now vertically protruding second threaded bolt 68.

As FIG. 1 is the most preferred embodiment of the present invention, it also displays the permanent attachment of the second end 16 of the main body portion 12 to the second threaded bolt 68. This attachment ensures that the second threaded bolt 68 will not be lost or separated from the main body portion 12 when the second threaded bolt 68 is not removably secured to the second threaded bore 22 of the main body portion 12. This permanent attachment is accomplished by permanently securing a wire cable 74 to each of the second threaded bolt 68 and the second end 16 of the main body portion 12 with a fourth screw 76 and a fifth screw 78. The fourth screw 76 is inserted into the second end 16 of the main body portion 12, while the fifth screw 78 is inserted into the second threaded bolt 68. The most preferred fourth screw 76 and fifth screws 78 are fourth and fifth hexagon socket set screws 76 and 78. This permanent attachment further ensures that the complete tire tool 10 will be portable for ease of use at any location.

Figure 2:
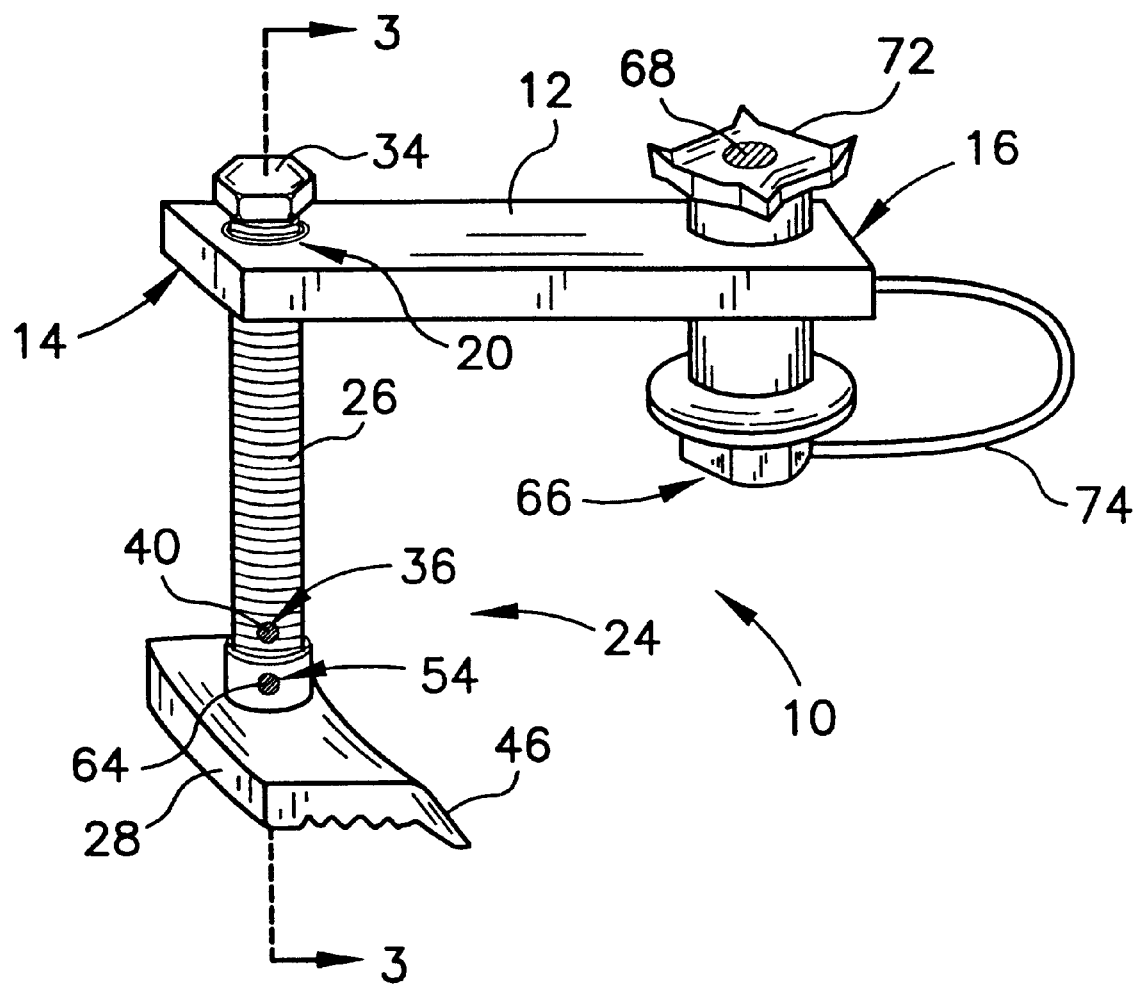
FIG. 2 displays the side elevational view of the tire tool with all of its components attached.
Figure 3:
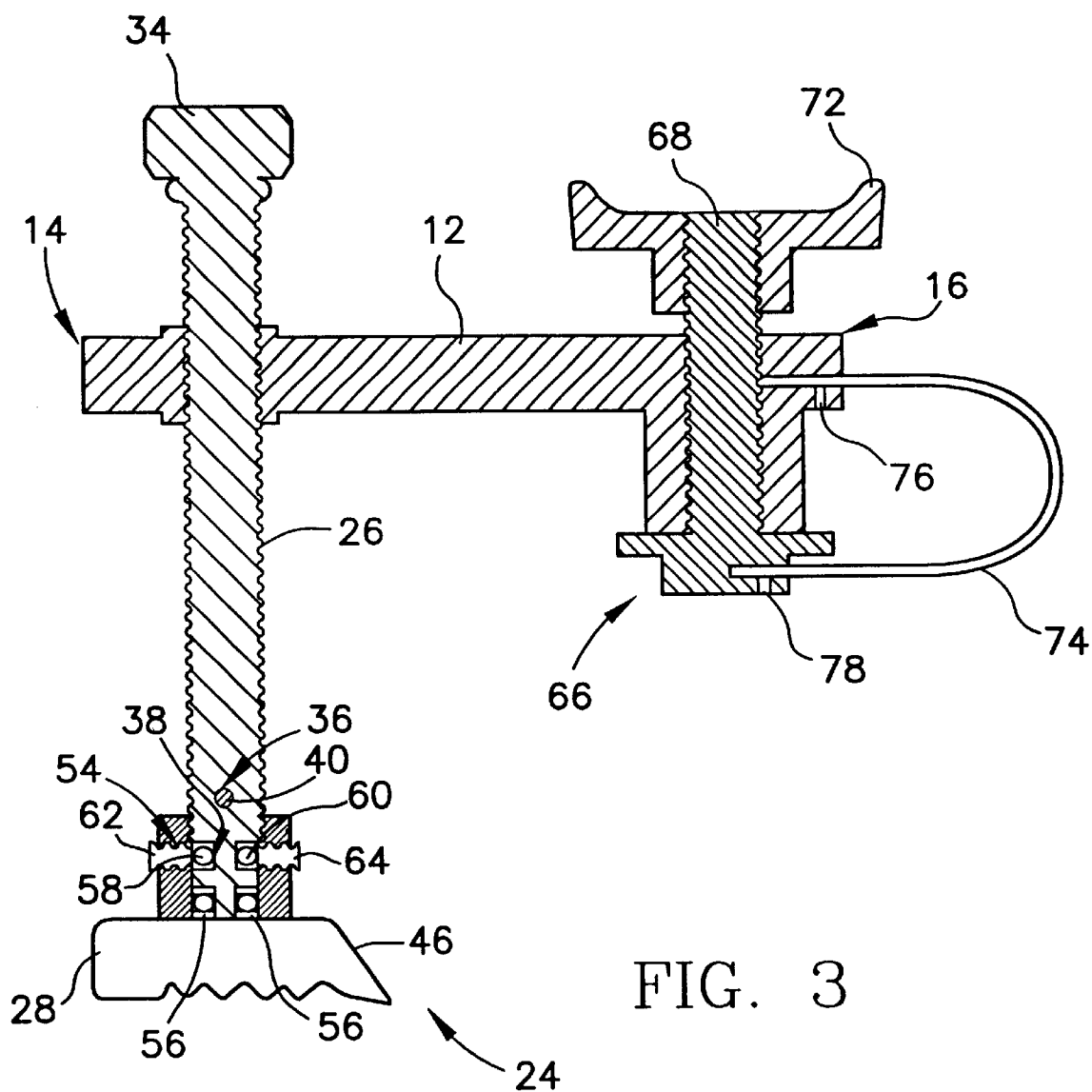
FIG. 3 shows the side cross-sectional view of the tire on line 3—3 displayed in FIG. 2.

FIG. 2 shows a side elevational view of the tire tool 10 when all of its components are secured. FIG. 3 shows a cross-sectional view on line 3—3 in FIG. 2 of the tire tool 10 when all of its components are secured. The same components displayed in FIG. 1 are also shown in FIGS. 2 and 3 with the matching parts numbers.

Figure 4:
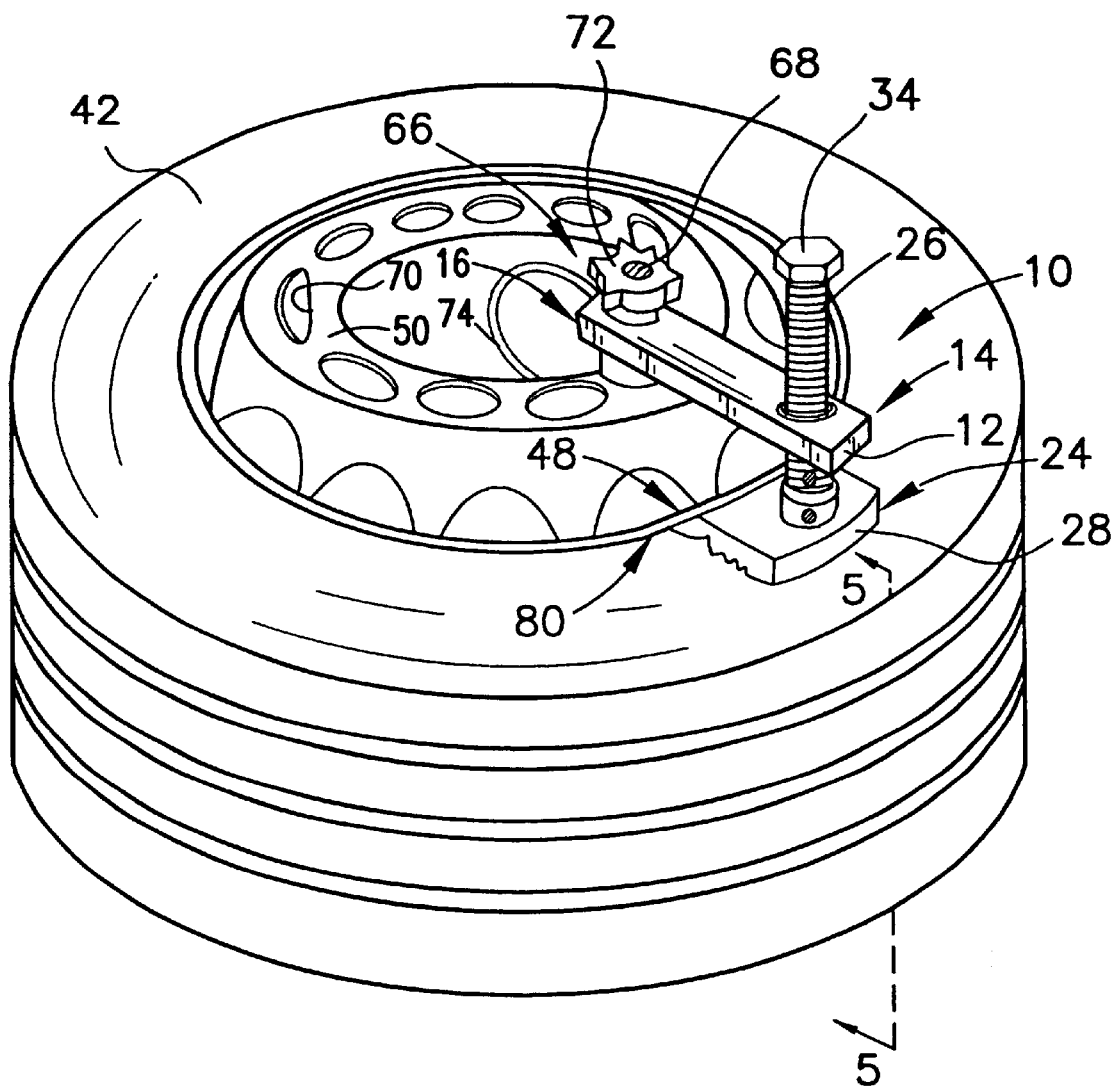
FIG. 4 shows a front perspective view of the tire tool when it rests on the tire and is secured to the rim.

FIG. 4 shows the tire tool 10 resting on the tire 42 and secured to the wheel rim 50. As FIG. 4 shows, the main body portion 12 should be sized so that when the second threaded bolt 68 of the engaging means 66 engages one of the stud holes 70 of the rim 50, the wheel socket 28 of the driving means 24 rests on the tire bead 80 proximate the outer periphery 48 of the wheel rim 50. The first end 14 of the main body portion 12 should be adapted for positioning above the tire 42, while the second end 16 of the main body portion 12 should be adapted for positioning above the stud holes 70 of the wheel rim 50.

Figure 5:
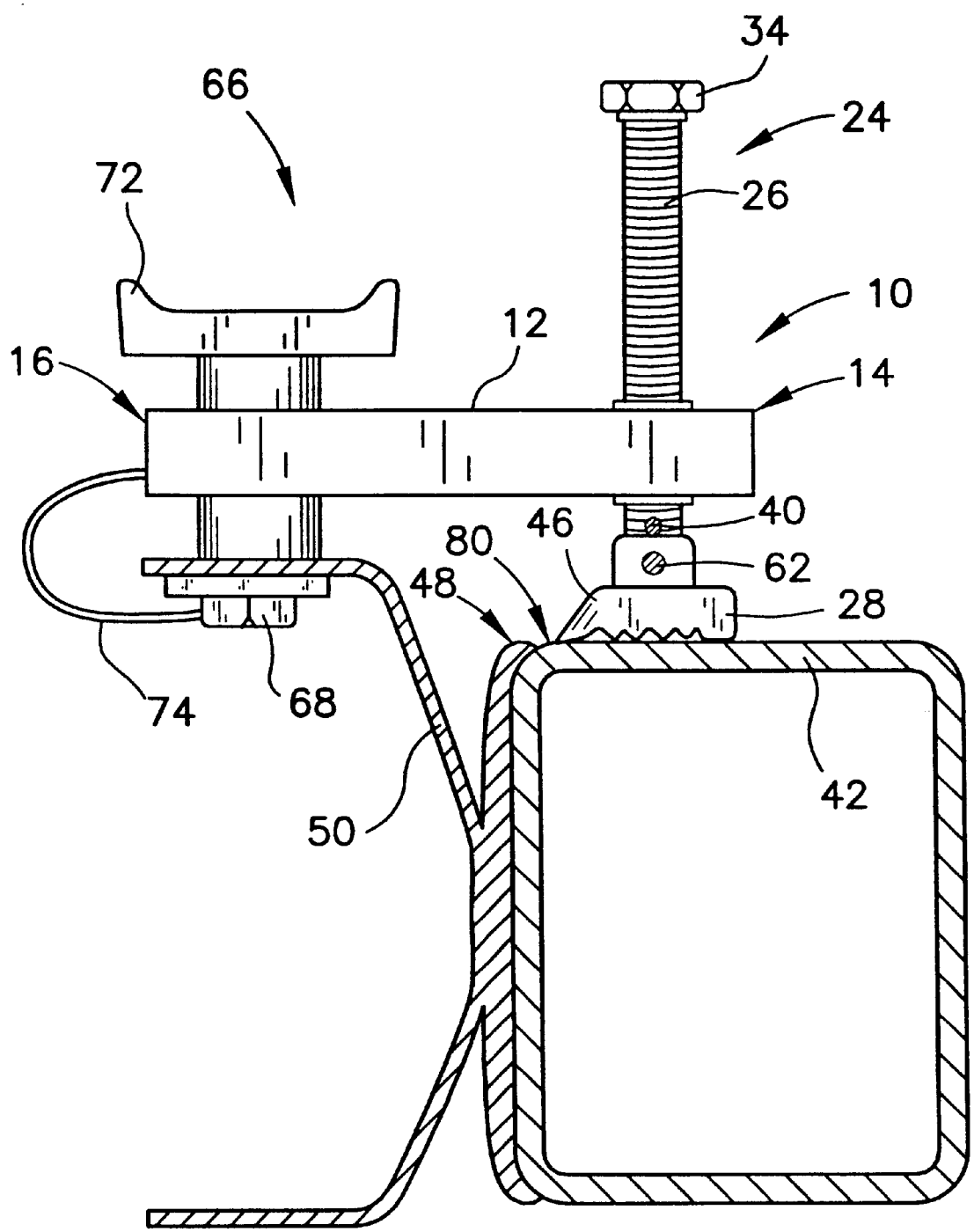
FIG. 5 displays the sectional elevational view of the tire and rim on line 5—5 from FIG. 4 when the tire tool rests on the tire and is secured to the rim.
Figure 6:
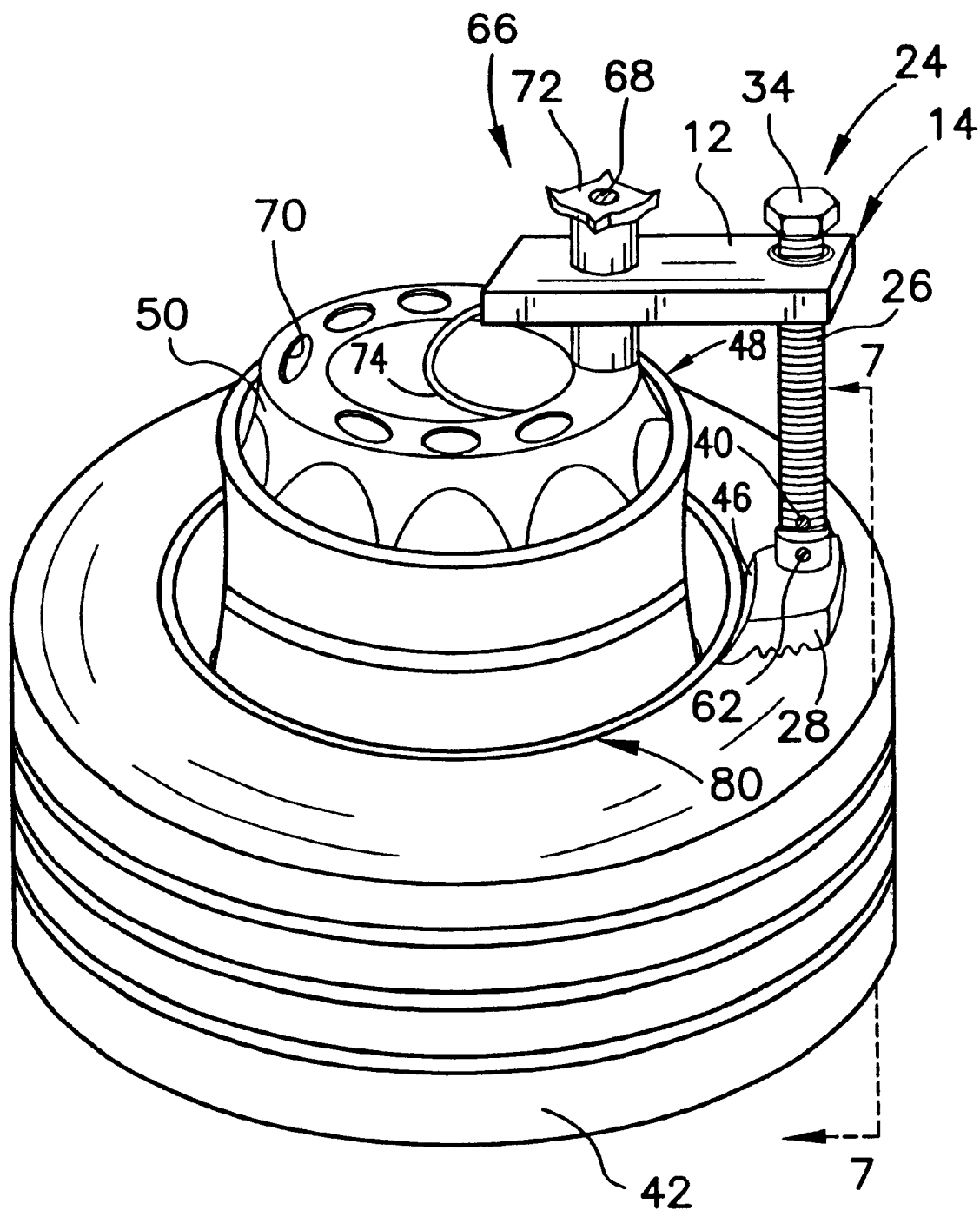
FIG. 6 is a side elevational view of the tire tool breaking the tire bead from the wheel rim.

FIG. 5 shows the cross-sectional view of the tire 42 and rim 50 when the tire tool 10 (shown in side elevational view) rests on the tire 42 and is secured to the rim 50. In particular, FIG. 5 shows the sectional view of line 5—5 in FIG. 4. The tire bead 80 has not been broken from the rim 50 in FIGS. 4 and 5.

Once the tire tool 10 rests on the tire 42 and is fully secured to the rim 50 in the above-described manner, applying a force on the driving means 24 breaks the tire bead 80. It should be readily understood that there are numerous ways for applying such force. However, it is preferred that a rotational force be applied to the head 34 of the first threaded bolt 26; this results in a downward motion of the driving means 24 relative to a counter-active upward motion of the engaging means 66 that is secured to the rim 50. Such a motion and counter motion result in the breaking of the tire bead 80 from the rim 50 in a quick and safe manner; this is displayed in FIG. 6.

Figure 7:
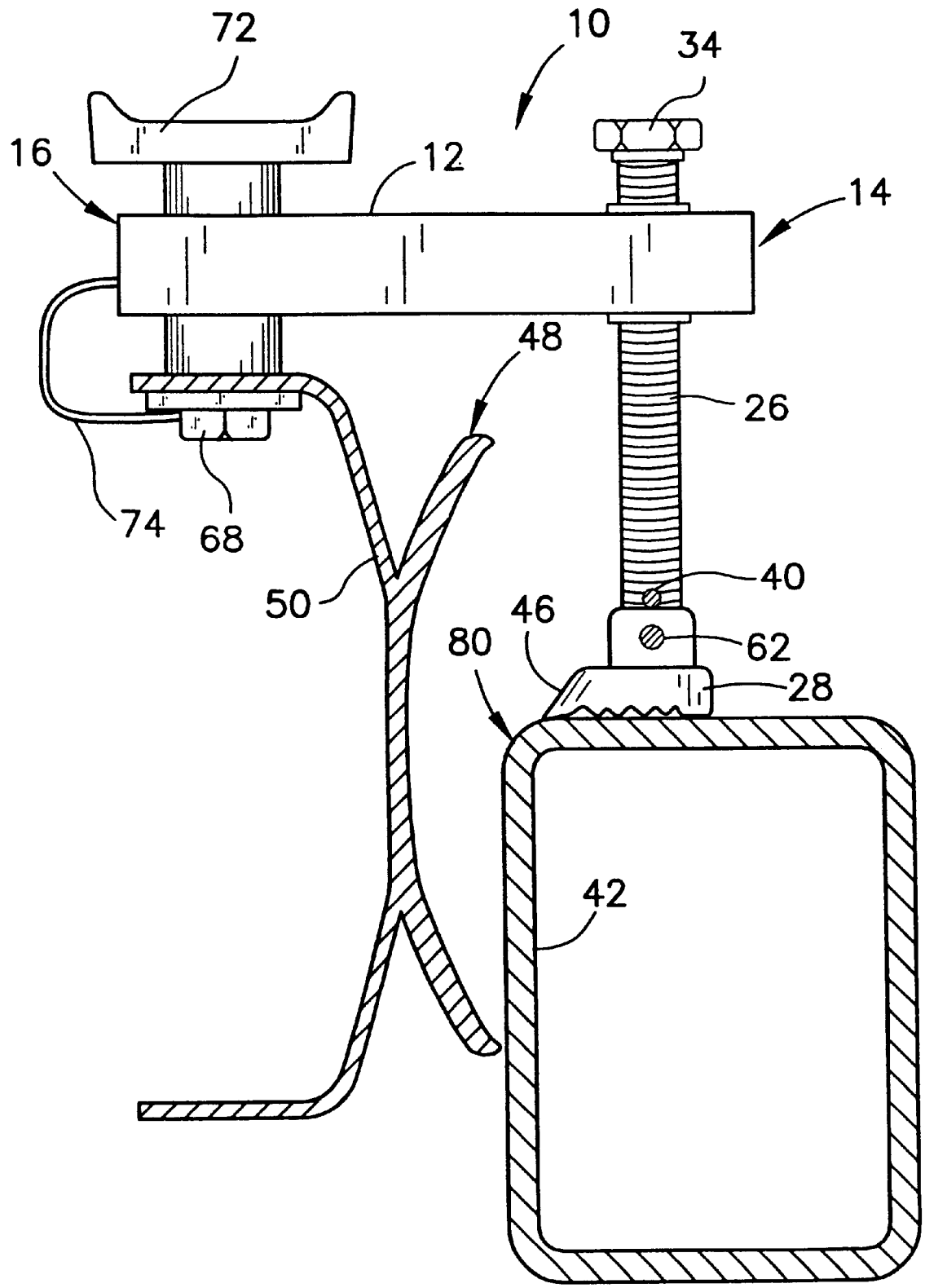
FIG. 7 shows the sectional elevational view of the tire and rim on line 7—7 from FIG. 6 when the tire tool causes the tire bead to break from the wheel rim.

FIG. 7 shows the cross-sectional view of the tire 42 and rim 50 when the tire tool 10 (shown in side elevational view) breaks the tire bead 80 from the rim 50. In particular, FIG. 7 shows the sectional view of line 7—7 from FIG. 6.

Figure 8:
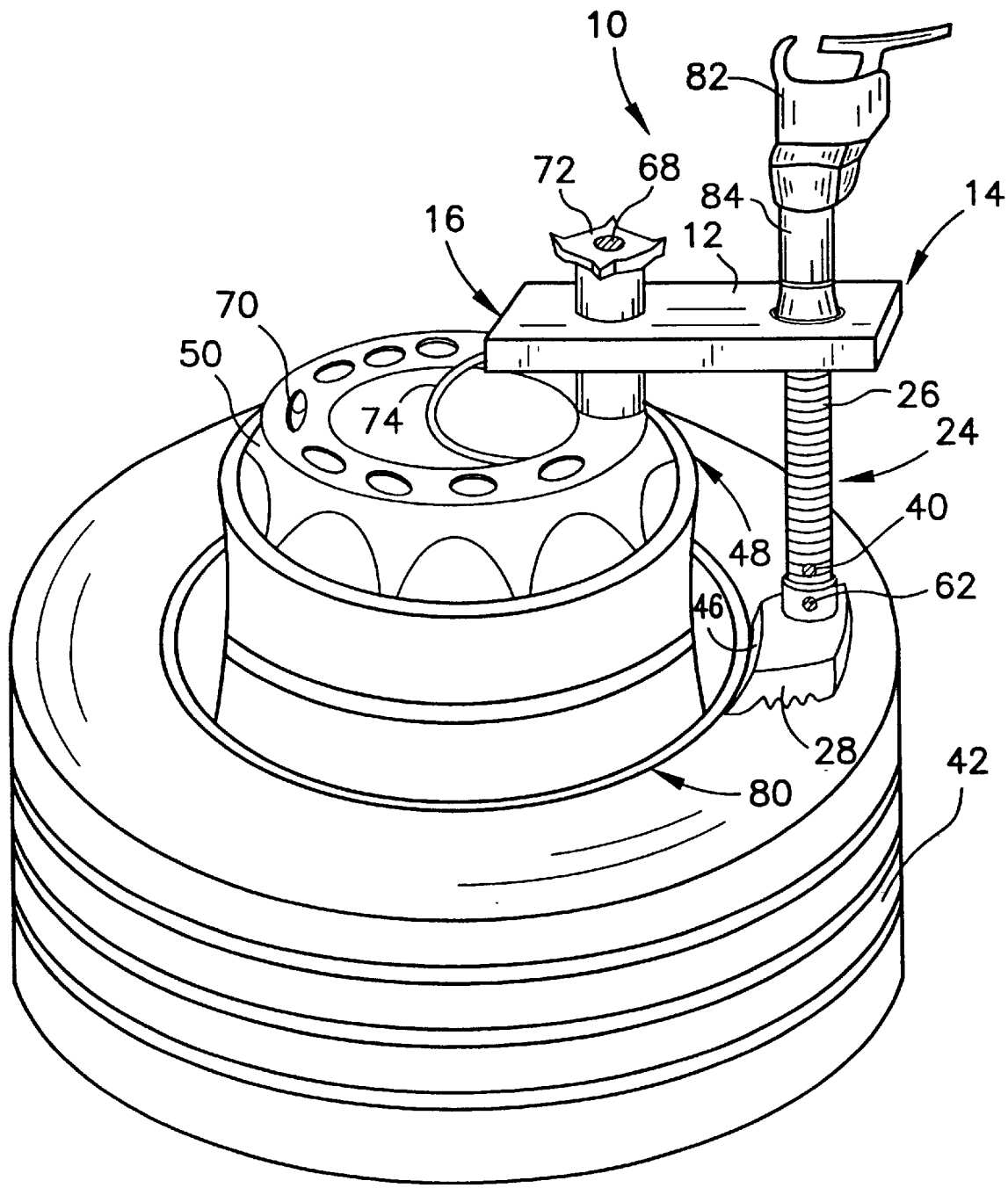
FIG. 8 is a side elevational view of the impact gun as a device to facilitate the tire tool in breaking the tire bead from the rim.

FIG. 8 shows a conventional impact gun 82 as the device which imparts rotational force to facilitate the driving means 24 to accomplish the breaking of the bead 80 of the tire 42 from the wheel rim 50. The impact gun 82 has a socket 84 adapted to engage the head 34 (not shown in FIG. 8) of the first threaded bolt 26. In this embodiment, after the tire tool 10 is assembled and secured to the tire 42 and wheel rim 50, as described above, the socket 84 of the impact gun 82 is removably secured to the head 34 (not shown in FIG. 8) of the first threaded bolt 26. Then, the impact gun 82 is turned on, which results in a rotational force on the first threaded bolt 26. This action forces the main body portion 12 to move in a counter-active upward motion, and results in the rim 50 being separated from the tire bead 80. It is most preferred that the socket 84 of the impact gun 82 have an 1½ diameter, although it will readily be understood by those skilled in the art that the invention will be operable as long as the socket 84 of the impact gun 82 is sized to cooperatively engage the head 34 (not shown in FIG. 8) of the first hexagon head bolt 26.

Other manual devices may be used to facilitate the driving means 24, so as to break the tire bead 80 from the rim 50. While these devices are not pictured, two such manual devices are a ratchet and a wrench. In each case, the rotational motion is the same as already described above for the impact gun 82, except that manual force will be used, instead of mechanical motor force, to accomplish the breaking of the bead 80. It is preferred that the ratchet and the wrench have sockets sized to fit the head 34 of the first threaded bolt 26, so that each device is properly used to facilitate the driving means 24. In particular, the sockets of each of the ratchet and wrench should preferably be 1½ inches in diameter to properly fit the head 34 of the first hexagon head bolt 26.

It should also be readily understood by those skilled in the art that a grease-like substance, such as SUPER SLICK 'EM, TM, available from Gaither Tool Company, 2255 W. Monroe Ave., Jacksonville, Ill. 62650, may be applied on the tire 42 at a position between the outer periphery 48 of the wheel rim 50 and the tire bead 80 to facilitate the breaking of the bead 80 from the wheel rim 50. The tire 42 can also be deflated before the removal technique is initiated; this allows removal of the rim 50 from the tire 42 to be accomplished even more quickly and easily.

Those of skill in the art will recognize that the tire tool 10 can be made of any strong, durable material. In particular, the most preferred material from which the tire tool 10 can be made is either iron or steel. But, one skilled in the art will further recognize that the tire tool 10 can be made from a variety of other materials and composites that are known to be strong and durable in the art. The present invention, therefore, will not be viewed by those skilled in the art as being limited in its composition to either steel or iron.

The foregoing discussion is illustrative of the invention. However, since many embodiments of the invention can be made without departing from the spirit and scope of the invention, the invention resides wholly in the claims hereinafter appended.

What is claimed is:

1. A tire tool for facilitating the removal of a tire from a wheel rim, the rim of the type having a plurality of stud holes spaced generally radially outwardly from the center of the rim, said tire tool comprising:

(a) a main body portion having a first end and a second end, said main body portion having a first threaded bore extending vertically therethrough proximate the first end and having a second threaded bore extending vertically therethrough proximate the second end, wherein said main body portion is sized to extend lengthwise from the plurality of stud holes of said rim to an inner edge of said tire;

(b) means for releasably engaging said main body portion to the plurality of stud holes of said rim, said engaging means being removably secured to the second bore of said main body portion and to the plurality of stud holes of said rim, and (c) means for driving the first end of said main body portion in a downward direction, said driving means being removably secured to the first bore of said main body portion and resting on said tire, whereby said driving means causes the bead of the tire to break from the rim of the wheel.

2. The tire tool of claim 1 wherein said main body portion is substantially planar.

3. The tire tool of claim 2 wherein said main body portion comprises a bracket plate.

4. The tire tool of claim 1 wherein said driving means comprises:

(a) a first threaded bolt having a horizontally extending threaded aperture near the bottom end thereof, said first threaded bolt further having a horizontal groove located below the horizontally extending threaded aperture thereof, said first threaded bolt being removably secured to the first threaded bore of said main body portion, and (b) a wheel socket having a vertically protruding hole therethrough, said wheel socket adapted to rest on the inner edge of said tire, whereby said first threaded bolt is further removably secured to the vertically protruding hole of said wheel socket.

5. The tire tool of claim 4 wherein said first threaded bolt comprises a hexagon head bolt.

6. The tire tool of claim 4 further comprising a third screw having a length greater than the length of the horizontally extending threaded aperture of said first threaded bolt, said third screw being removably inserted into the horizontally extending threaded aperture of said first threaded bolt, whereby said third screw prevents said first threaded bolt from piercing through the wheel socket when said first threaded bolt is removably secured therein.

7. The tire tool of claim 6 wherein said wheel socket defines a generally arcuate edge portion.

8. The tire tool of claim 7 wherein said wheel socket further defines a first horizontally extending threaded hole and a second horizontally extending threaded hole, said first threaded hole and said second threaded hole of said wheel socket positioned at opposite locations proximate the vertically protruding hole of said wheel socket.

9. The tire tool of claim 8 further comprising:
  (a) a thrust ball bearing, said thrust ball bearing being removably inserted into the vertically protruding hole of said wheel socket before said first threaded bolt is inserted therein,
  (b) a first steel ball and a second steel ball sized to fit into the opposing horizontally extending first threaded hole and second threaded hole of said wheel socket, said first steel ball and said second steel ball being removably inserted into the opposing horizontally extending first threaded hole and second threaded hole of said wheel socket so as to contact the horizontal groove of said removably secured first threaded bolt, and
  (c) a first screw and a second screw sized to fit into the opposing horizontally extending first threaded hole and second threaded hole of said wheel socket, said first screw and said second screw being removably inserted into the opposing horizontally extending first threaded hole and second threaded hole of said wheel socket adjacent to said first steel ball and second steel ball.

10. The tire tool of claim 9 wherein said first screw, said second screw and said third screw comprise a first hexagon socket set screw, a second hexagon socket set screw and a third hexagon socket set screw.

11. The tire tool of claim 1 wherein said engaging means comprises a threaded engaging means.

12. The tire tool of claim 11 wherein said threaded engaging means comprises a second threaded bolt, whereby said second threaded bolt is inserted vertically upward through one of the plurality of stud holes of said rim, said second threaded bolt is further inserted through the second threaded bore of said main body portion, thereby releasably engaging said main body portion to the one of the plurality of stud holes of said rim.

13. The tire tool of claim 12 further comprising a wing nut, whereby said wing nut is removably secured to said second threaded bolt at a position above the second threaded bore of said main body portion.

14. The tire tool of claim 13 further comprising a wire cable, whereby said wire cable permanently secures said second threaded bolt to the second end of said main body portion when said second threaded bolt is not releasably engaged to the second threaded bore of said main body portion.

15. The tire tool of claim 14 wherein said wire cable is fastened to said second threaded bolt and to the second end of said main body portion by a fourth screw and a fifth screw, said fourth screw being inserted into the second end of said main body portion, and said fifth screw being inserted into said second threaded bolt.

16. The tire tool of claim 15 wherein said second threaded bolt comprises a hexagon head bolt.

17. The tire tool of claim 15 wherein said fourth screw and said fifth screw comprise a fourth hexagon socket set screw and a fifth hexagon socket set screw.

18. A tire tool for facilitating the removal of a tire from a wheel rim, the rim of the type having a plurality of stud holes spaced generally radially outwardly from the center of the rim, said tire tool comprising:
  (a) a main body portion having a first end and a second end, said main body portion having a first threaded bore extending vertically therethrough proximate the first end and having a second threaded bore extending vertically therethrough proximate the second end,
  (b) a means for releasably engaging said main body portion to the plurality of stud holes of said rim, said engaging means being removably secured to the second threaded bore of said main body portion and to the plurality of stud holes of said rim,
  (c) a means for driving the first end of said main body portion in a downward direction, said driving means being removably secured to the first threaded bore of said main body portion and resting on said tire, and
  (d) a device to facilitate said driving means,
  whereby said driving means causes the bead of the tire to break from the rim of the wheel.

19. The tire tool of claim 18 wherein said device comprises an impact gun.

20. The tire tool of claim 19 wherein said impact gun defines 1½ inch socket.

21. The tire tool of claim 18 wherein said device comprises a ratchet.

22. The tire tool of claim 21 wherein said ratchet defines a 1½ inch socket.

23. The tire tool of claim 18 wherein said device comprises a wrench.

24. The tire tool of claim 23 wherein said wrench defines a 1½ inch socket.

* * * * *